(12) United States Patent
Annen et al.

(10) Patent No.: US 11,385,787 B2
(45) Date of Patent: Jul. 12, 2022

(54) ELECTRONIC DEVICE AND PROGRAM

(71) Applicant: SEIKO EPSON CORPORATION, Tokyo (JP)

(72) Inventors: Mitsuru Annen, Matsumoto (JP); Yasutaka Shibagaki, Cibatu Cikarang Selatan (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/807,986

(22) Filed: Mar. 3, 2020

(65) Prior Publication Data
US 2020/0285378 A1  Sep. 10, 2020

(30) Foreign Application Priority Data
Mar. 6, 2019  (JP) .............................. JP2019-040398

(51) Int. Cl.
*G06F 3/04847* (2022.01)
*G06F 3/0485* (2022.01)
*H04N 1/00* (2006.01)

(52) U.S. Cl.
CPC ........ *G06F 3/04847* (2013.01); *G06F 3/0485* (2013.01); *H04N 1/00411* (2013.01)

(58) Field of Classification Search
CPC ................................................. G06F 3/04847
See application file for complete search history.

(56) References Cited

U.S. PATENT DOCUMENTS

| | | | |
|---|---|---|---|
| 9,495,090 B2 | 11/2016 | Ohtsuka et al. | |
| 2014/0149922 A1* | 5/2014 | Hauser | G06F 3/0488 715/784 |
| 2014/0292760 A1* | 10/2014 | Shikolay | G06F 3/0488 345/428 |
| 2014/0298251 A1* | 10/2014 | Ohtsuka | G06F 3/04883 715/784 |
| 2016/0179322 A1* | 6/2016 | Nagata | G06F 3/04883 715/784 |

FOREIGN PATENT DOCUMENTS

| | | |
|---|---|---|
| JP | 2014-056328 | 8/2013 |
| JP | 2013-168087 | 3/2014 |

* cited by examiner

*Primary Examiner* — Roland J Casillas
(74) *Attorney, Agent, or Firm* — Workman Nydegger

(57) ABSTRACT

A printer device includes an operation panel and a printer device control unit that determines whether or not a flick operation performed on the operation panel includes repeatedly performed operations and disables acceptance of a tap operation from the time the flick operation has ended for a longer period when it is determined that the flick operation performed on the operation panel includes repeatedly performed operations than when it is determined that the flick operation performed on the operation panel does not include repeatedly performed operations.

9 Claims, 9 Drawing Sheets

12a

| OPERATION | OPERATION INTERVAL |
|---|---|
| FIRST FLICK OPERATION | |
| | ta |
| SECOND FLICK OPERATION | |
| | tb |
| THIRD FLICK OPERATION | |
| | tc |
| FOURTH FLICK OPERATION | |
| | td |
| FIFTH FLICK OPERATION | |
| | te |
| FIRST TAP OPERATION | |
| | tf |
| SIXTH FLICK OPERATION | |
| | tg |
| SEVENTH FLICK OPERATION | |
| | th |
| EIGHTH FLICK OPERATION | |
| | ti |
| NINTH FLICK OPERATION | |
| | tj |
| SECOND TAP OPERATION | |
| ⋮ | ⋮ |

ELECTRONIC DEVICE AND PROGRAM

The present application is based on, and claims priority from JP Application Serial Number 2019-040398, filed Mar. 6, 2019, the disclosure of which is hereby incorporated by reference herein in its entirety.

BACKGROUND

1. Technical Field

The present disclosure relates to an electronic device and a program.

2. Related Art

In the art disclosed in JP-A-2013-168087, when a scroll process is caused by a flick operation, acceptance of a tap operation is disabled after the scroll process is started, and disabling the acceptance of a tap operation is cancelled before the scroll process ends to prevent an erroneous user operation such as a tap operation performed on a button within a scroll area.

In JP-A-2013-168087, when a subtle flick operation is repeated, for example, since a scroll process ends quickly, an erroneous user operation may be performed.

SUMMARY

According to an aspect of the present disclosure, an electronic device includes: a digitizer; a determination unit that determines whether or not a flick operation performed on the digitizer includes repeatedly performed operations; and a disabling unit that disables acceptance of a tap operation from an end of the flick operation for a longer period when it is determined that the flick operation performed on the digitizer includes repeatedly performed operations than when it is determined that the flick operation performed on the digitizer does not include repeatedly performed operations.

According to another aspect of the present disclosure, an electronic device includes: a digitizer; a determination unit that determines whether or not a flick operation performed on the digitizer includes repeatedly performed operations in which the flick operation causes a scroll process to be performed; and a disabling unit that disables acceptance of a tap operation from an end of the scroll process caused by the flick operation for a longer period when it is determined that the flick operation performed on the digitizer includes repeatedly performed operations than when it is determined that the flick operation performed on the digitizer does not include repeatedly performed operations.

According to another aspect of the present disclosure, a program causes an electronic device having a digitizer to perform: determining whether or not a flick operation performed on the digitizer includes repeatedly performed operations; and disabling acceptance of a tap operation from an end of the flick operation for a longer period when it is determined that the flick operation performed on the digitizer includes repeatedly performed operations than when it is determined that the flick operation performed on the digitizer does not include repeatedly performed operations.

According to another aspect of the present disclosure, a program causes an electronic device having a digitizer to perform: determining whether or not a flick operation performed on the digitizer includes repeatedly performed operations in which the flick operation causes a scroll process to be performed; and disabling acceptance of a tap operation from an end of the scroll process caused by the flick operation for a longer period when it is determined that the flick operation performed on the digitizer includes repeatedly performed operations than when it is determined that the flick operation performed on the digitizer does not include repeatedly performed operations.

DESCRIPTION OF EXEMPLARY EMBODIMENTS

First Embodiment

Figure 1:
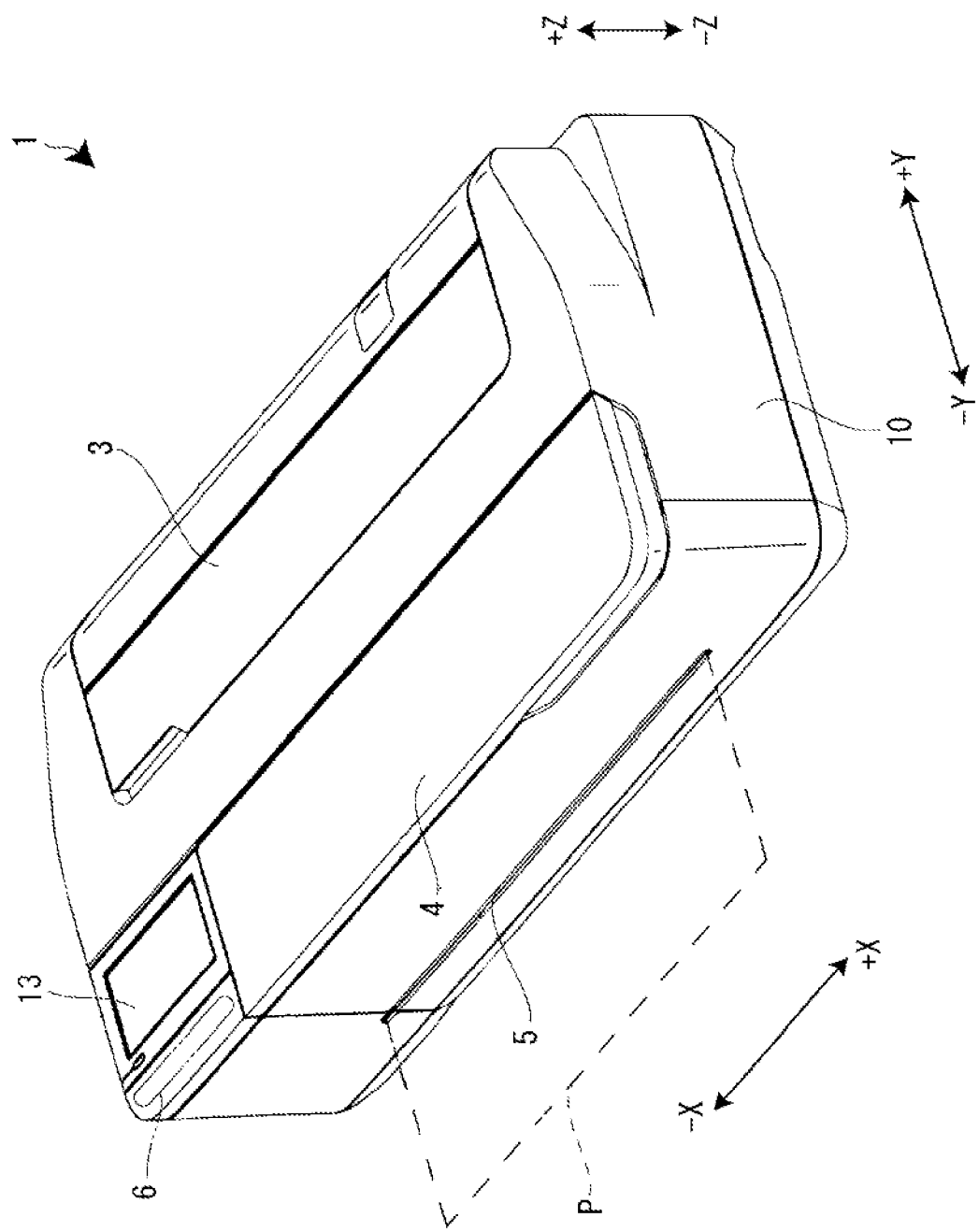
FIG. 1 is a perspective external view of a printer device.

An electronic device and a program in accordance with one embodiment will be described below with reference to the attached drawings. FIG. 1 is a perspective external view of a printer device 1 that is an example of an electronic device denoted herein as "electronic device". The printer device 1 has a casing 10 that is substantially a rectangular parallelepiped. On the upper face that is a face in the +Z direction of the casing 10, a sheet feeder cover 3 located in the +Y direction and a maintenance cover 4 located in the −Y direction are provided so as to be opened and closed. Further, on the front face that is a face in the −Y direction of the casing 10, a discharge slot 5 from which a printed sheet P is discharged is provided.

An operation panel 13 used for various operations in the printer device 1 is provided in the −X direction at a position adjacent to the maintenance cover 4 on the top face of the casing 10. The operation panel 13 is an example of the digitizer. The operation panel 13 is provided rotatably about a revolving shaft 6, and the position thereof can be changed between an inclined position illustrated in FIG. 1 and a selected position (not illustrated).

Next, the control configuration of the printer device 1 will be described with reference to FIG. 2. The printer device 1 has a printer device control unit 11, a printer device storage unit 12, the operation panel 13, a printer mechanism 14, and a printer device communication unit 15. The printer device control unit 11 is an example of units denoted herein as "determination unit" and "disabling unit".

The printer device control unit 11 includes a central processing unit (CPU) 11a, a read-only memory (ROM) 11b, a random access memory (RAM) 11c, and a timer 11d. The CPU 11a controls respective components in the printer device 1 by loading a control program stored in the ROM 11b into the RAM 11c and executing the control program. The control program is an example of a program denoted herein as "program".

Note that the printer device control unit 11 may use a processor other than the CPU 11a. The processor may be formed of a hardware circuit such as an application specific integrated circuit (ASIC), for example. Further, the processor may be configured such that one or more CPUs and a hardware circuit such as an ASIC cooperate with each other. The timer 11d is a device used for measuring time and, in the present embodiment, measures mainly time of an operation interval and a disabled period described later.

Figure 3:
FIG. 3 is diagram illustrating an example of an operation history.

The printer device storage unit 12 is a storage device such as flash memory, for example, and in the present embodiment stores mainly an operation history 12a. FIG. 3 is a diagram illustrating an example of the operation history 12a. The operation history 12a is a history that records user operations performed on the operation panel 13 and the operation interval thereof. One example of the operation interval is a time interval from a time when the printer device control unit 11 identifies a user operation performed on the operation panel 13 to a time when the printer device control unit 11 identifies the next operation. However, the operation interval may be a time interval from a time when a user operation ends to a time when the next operation is started without being limited to the above. Note that, although an operation number is assigned to an operation, such as "first flick operation", "second flick operation", or the like, such an operation number is provided to distinguish respective operations, and it is not necessary to implement the operation number.

Figure 2:
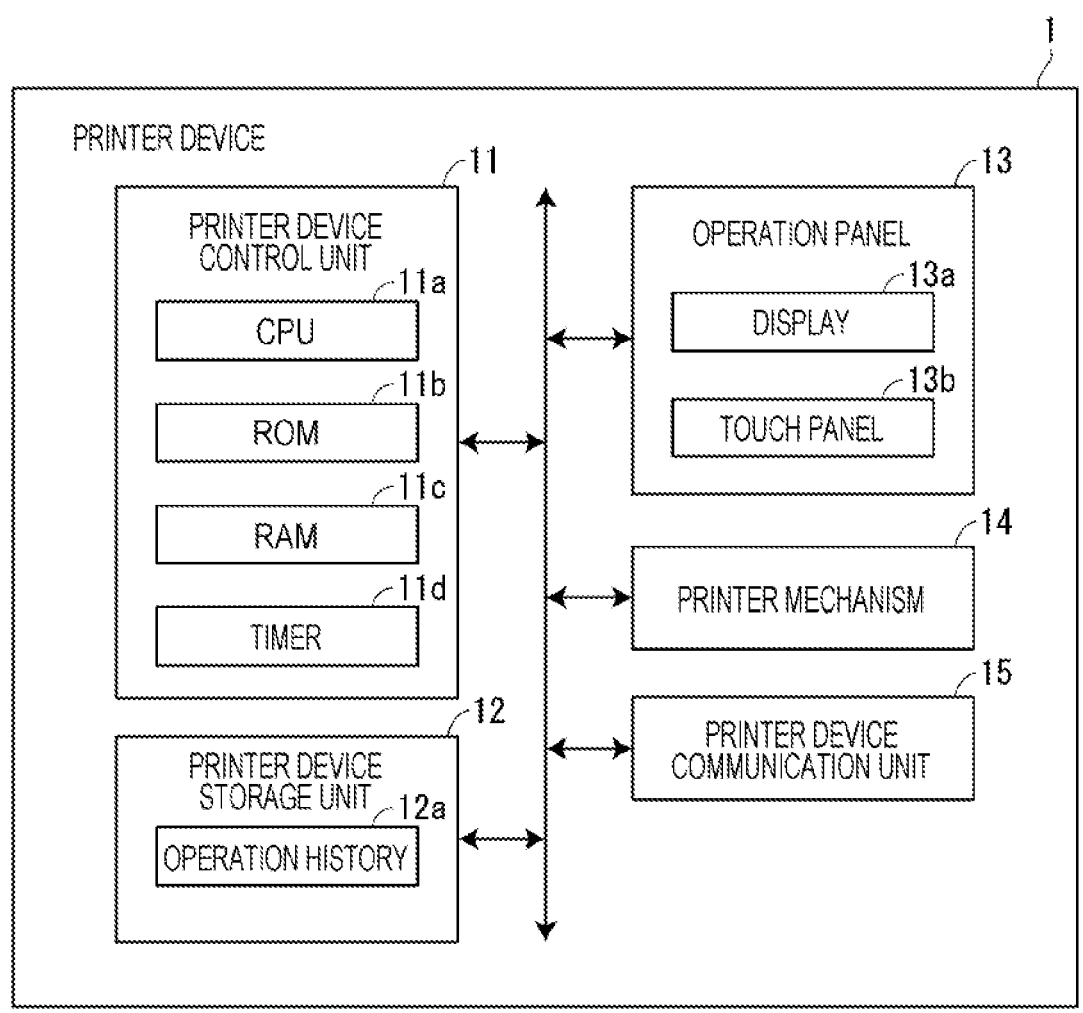
FIG. 2 is a block diagram illustrating a control configuration of the printer device.

One example of an operation recorded in the operation history 12a illustrated in FIG. 2 may be, for example, a flick operation or a tap operation. In the present embodiment, "flick operation" denotes an operation performed on a screen of quickly moving an operating member such as a pen or a finger on the screen and then removing the operating member from the screen. For example, an operation to flip a screen by using an operating member and an operation to swipe a screen by using an operating member are each a type of flick operation. By performing a flick operation, the user is able to cause a scroll process of scrolling a screen or an entry process of inputting a character. On the other hand, "tap operation" refers to an operation of making light contact on a screen by using an operating member. By performing a tap operation, the user is able to perform a selection process of selecting an icon or a button. Note that "scroll process", "entry process", and "selection process" denote operations performed via the operation panel 13 in accordance with display control of the printer device control unit 11. Note that raw information obtained before determining which operation, for example a flick operation, the user operation is classified as and indicating the point on a touch panel 13b that is touched by the user may be recorded in the operation history 12a instead of information such as that corresponding to a flick operation or a tap operation.

When performing a flick operation to cause a scroll process to be performed, the user may erroneously tap a button within a scroll area, and an unintended selection process may be performed. To address such an inconvenience, there is a technique of setting a disabled period in which acceptance of a tap operation is disabled from the time a flick operation has ended. However, when such a disabled period is set to a period from the time a flick operation has ended to a predetermined period before the end of a scroll process, when a gradual scroll process is intended by a subtle flick operation, an erroneous tap operation may not be suppressed because a scroll process ends quickly.

Accordingly, the printer device control unit 11 in accordance with the present embodiment determines whether or not a flick operation performed on the operation panel 13 includes a repeatedly performed operation and, if the flick operation includes repeatedly performed operations, sets a disabled period to be longer than that in the case where the flick operation does not include repeatedly performed operations. Accordingly, even when a scroll process caused by a repetition of flick operations is performed, an erroneous tap operation may be suppressed. Control performed by the printer device control unit 11 to suppress an erroneous operation at the time of a scroll process will be described below in detail.

Note that operations other than a flick operation and a tap operation may be recorded in the operation history 12a illustrated in FIG. 3. For example, "long tap operation" denotes an operation of pressing the screen for a long time by using an operating member, "drag operation" denotes an operation of moving an operating member while pressing the screen for a long time, "pinch-out operation" denotes an operation of moving two operating members away from each other while both operating members are in contact with the screen, and "pinch-in operation" denotes an operation of moving two operating members toward each other while both operating members are in contact with the screen, and any of such operations or the like may be recorded.

Turning back to the description of FIG. 2, the operation panel 13 is a device in which a display 13a and the touch panel 13b are combined. The display 13a displays various information, for example, scrolls the display, and displays a selected state and a non-selected state in a distinguishable manner in accordance with display control performed by the printer device control unit 11. The touch panel 13b outputs, to the printer device control unit 11, a signal in accordance with the position at which a user operation in performed.

Note that the processing scheme of the touch panel 13b is not particularly limited, and a resistive membrane scheme, a capacitive sensing scheme, a magnetic induction scheme, an infrared ray scheme, a surface acoustic wave scheme, or the like may be employed. Further, for an operating member used to perform an operation on the touch panel 13b, any operating member in accordance with various processing schemes, which may be one or more fingers or a pen, may be employed and is not particularly limited.

The printer mechanism 14 is a printer engine that performs printing on the sheet P (see FIG. 1). For example, when the printer device 1 is an ink jet printer, the printer mechanism 14 includes an ink jet head, a head drive mechanism, a printing medium transport mechanism, or the like. The printer device communication unit 15 communicates with an upstream device and receives print data from the upstream device. The printer device control unit 11 controls the printer mechanism 14 and performs printing on the sheet P in accordance with print data received from the upstream device.

Figure 4:
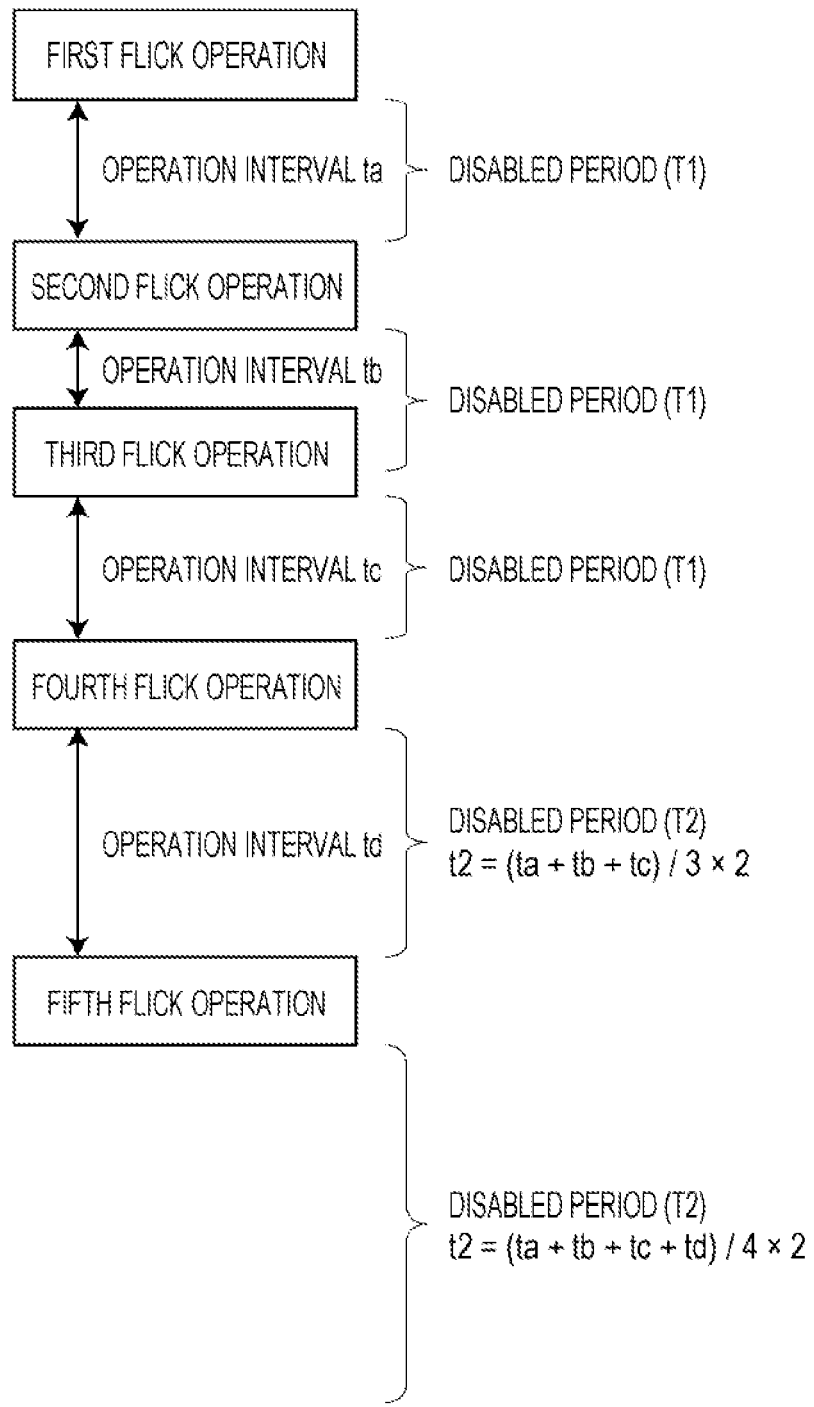
FIG. 4 is a diagram illustrating an example of a relationship between a flick operation and a disabled period.
Figure 5:
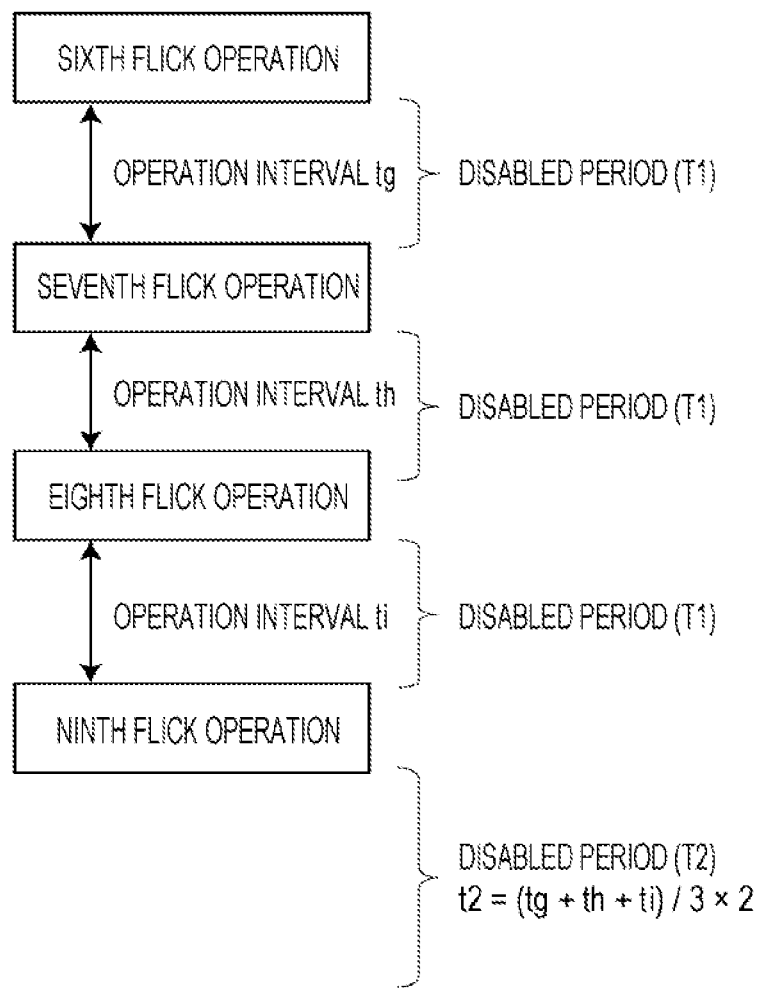
FIG. 5 is a diagram illustrating an example of a relationship between a flick operation and a disabled period, which is different from FIG. 4.

Next, with reference to FIG. 4 and FIG. 5, the relationship between a flick operation and a disabled period will be described. FIG. 4 and FIG. 5 illustrate disabled periods set when the operation history 12a illustrated in FIG. 3 is stored in the printer device storage unit 12.

As described above, the printer device control unit 11 in accordance with the present embodiment sets the disabled period, in which acceptance of a tap operation is disabled, to be longer when it is determined that a flick operation performed on the operation panel 13 includes repeatedly performed operations than when it is determined that the flick operation performed on the operation panel 13 does not include repeatedly performed operations. In the present embodiment, the printer device control unit 11 determines that a flick operation includes repeatedly performed operations when a flick operation performed on the operation panel 13 has been continuously performed four times or more. The instance "four times" is an example of "M times", where M is an integer greater than or equal to two. The printer device control unit 11 sets the disabled period to T1 when determining that the flick operation performed on the operation panel 13 does not include repeatedly performed operations. On the other hand, the printer device control unit 11 sets the disabled period to T2 when determining that the flick operation performed on the operation panel 13 includes repeatedly performed operations. Here, T1 and T2 have a relationship of $0 \leq T1 < T2$.

With reference to FIG. 4, specific description will be provided. As illustrated in FIG. 4, when a flick operation has been continuously performed five times, the printer device control unit 11 sets the disabled period to T1 at the end of the first flick operation, at the end of the second flick operation, and at the end of the third flick operation. Note that, in the present embodiment, the disabled period T1 is a predetermined period defined in advance. Further, the printer device control unit 11 sets the disabled period to T2 at the end of the fourth flick operation and at the end of the fifth flick operation, respectively.

The disabled period T1 can be any period greater than or equal to zero. If the disabled period T1 is zero, no disabled period is set unless an operation is performed continuously, and such a setting may be possible.

Next, a calculation method for the disabled period T2 will be described. The printer device control unit 11 calculates the length of the disabled period T2 in accordance with an operation interval of flick operations recorded in the operation history 12a. For example, the printer device control unit 11 calculates the length of the disabled period T2 in accordance with the mean value or the median value of an operation interval ta, an operation interval tb, and an operation interval tc, which are operation intervals of flick operations that have been repeatedly performed after the end of the fourth flick operation. In the present embodiment, the printer device control unit 11 calculates, as the disabled period T2, the length that is twice the mean value of the operation intervals of repeatedly performed flick operations. Note that "twice" is an example, and other multiples such as "1.5 times", "3 times", or the like may be used.

Similarly, the printer device control unit 11 calculates, as the disabled period T2, the length that is twice the mean value of the operation interval ta, the operation interval tb, the operation interval tc, and the operation interval td, which are operation intervals of flick operations that have been repeatedly performed after the end of the fifth flick operation. Note that it is preferable that the printer device control unit 11 set the disabled period to be longer when the mean value or the median value of operation intervals of repeatedly performed flick operations is equal to a first period than when the mean value or the median value of operation intervals of repeatedly performed flick operations is equal to a second period (where the first period is shorter than the second period).

On the other hand, as illustrated in FIG. 5, the printer device control unit 11 does not determine that a sixth flick operation is not a part of the repeatedly performed flick operations, because the previous operation is a first tap operation. Therefore, the printer device control unit 11 sets the disabled period to T1 after the end of the sixth flick operation. Similarly, the printer device control unit 11 sets the disabled period to T1 after the end of a seventh flick operation and after the end of an eighth flick operation.

Further, the printer device control unit 11 sets the disabled period to T2 after the end of a ninth flick operation. The printer device control unit 11 calculates, as the disabled period T2, the length that is twice the mean value of an operation interval tg, an operation interval th, and an operation interval ti, which are operation intervals of flick operations that have been repeatedly performed after the end of the ninth flick operation. In such a way, when determining that a flick operation performed on the operation panel 13 has been continuously performed M times or more, the printer device control unit 11 determines that the flick operation includes repeatedly performed operations and calculates the disabled period T2 in accordance with the operation intervals of flick operations continuously performed M times.

Figure 6:
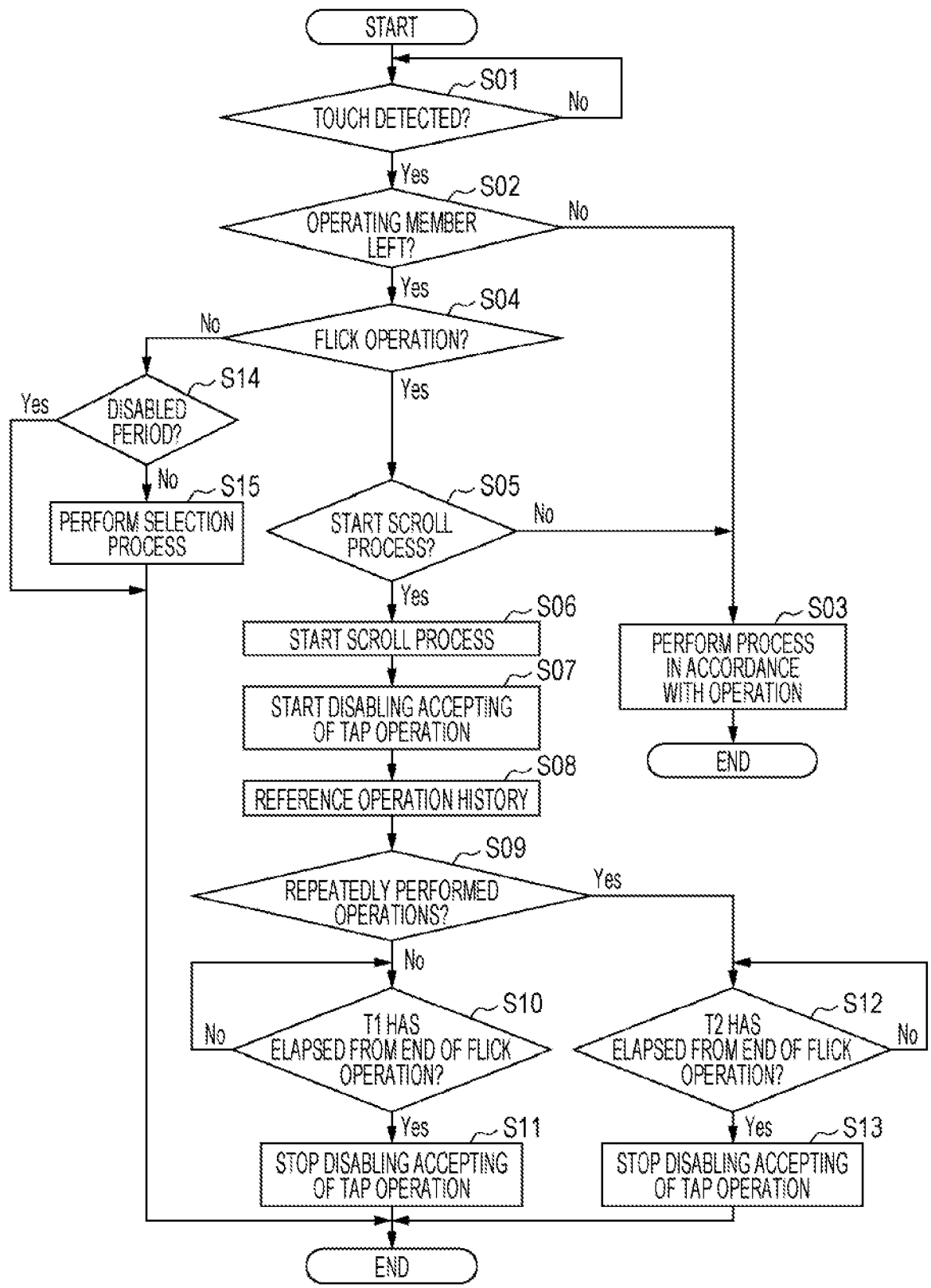
FIG. 6 is a flowchart illustrating a flow of an operation determination process in the printer device.

Next, with reference to the flowchart of FIG. 6, the flow of an operation determination process performed by the printer device 1 will be described. In response to detecting a touch operation performed on the operation panel 13 by an operating member (S01: Yes), the printer device control unit 11 determines whether or not the operating member is removed from the operation panel 13 within a predetermined period from the start of the touch (S02). If it is determined that the operating member is not removed from the operation panel 13 within the predetermined period (S02: No), the printer device control unit 11 performs a process in accordance with the operation performed by the operating member (S03) and ends the operation determination process. Note that the operation in which the operating member is not removed from the operation panel 13 within a predetermined period may be a long tap operation, a drag operation, or the like.

If it is determined that the operating member has been removed the operation panel 13 within the predetermined period (S02: Yes), the printer device control unit 11 determines whether or not the operation performed by the operating member is a flick operation (S04). If it is determined that the operation performed by the operating member is a flick operation (S04: Yes), the printer device control unit 11 determines whether or not to start a scroll process in accordance with the flick operation (S05). In this step, when determining that the flick operation is performed within a scroll-intended area and in the scroll-intended direction, the printer device control unit 11 determines that a scroll process is to be started.

If it is determined that a scroll process is not to be started (S05: No), the printer device control unit 11 performs a process in accordance with the flick operation (S03) and ends the operation determination process. The flick operation when no scroll process is started may be a flick entry process or the like. Further, if it is determined that a scroll process is to be started (S05: Yes), the printer device control unit 11 starts a scroll process (S06) and starts disabling acceptance of a tap operation (S07). In this step, measurement of the time of a disabled period is started by using the timer 11d. Further, the printer device control unit 11 references the operation history 12a (S08) and determines whether or not the flick operation in accordance with Yes-determination in S04 includes repeatedly performed operations (S09).

If it is determined that the flick operation does not include repeatedly performed operations (S09: No), the printer device control unit 11 determines whether or not the disabled period T1 has elapsed from the time a flick operation has ended in accordance with a result of time measurement performed by the timer 11*d* (S10). The end of a flick operation refers to the time when the operating member is removed from the operation panel 13 or the time when the printer device control unit 11 determines that a flick operation has been performed. If it is determined that the disabled period T1 has elapsed from the time the flick operation has ended (S10: No), the printer device control unit 11 enters a standby mode until the disabled period T1 elapses and if it is determined that the disabled period T1 has elapsed (S10: Yes), the printer device control unit 11 stops disabling acceptance of a tap operation (S11) and ends the operation determination process. Note that the disabled period T1 may be zero, that is, no disabled period T1 is provided. For example, when a flick operation is performed only once, a tap operation performed immediately after the end of the flick operation may be accepted.

Further, if it is determined that the flick operation includes repeatedly performed operations (S09: Yes), the printer device control unit 11 determines whether or not the disabled period T2 has elapsed from the time the flick operation has ended in accordance with a result of time measurement performed by the timer 11*d* (S12) and, if it is determined that the disabled period T2 has not yet elapsed (S12: No), the printer device control unit 11 enters a standby mode until the disabled period T2 elapses. If it is determined that the disabled period T2 has elapsed (S12: Yes), the printer device control unit 11 stops disabling acceptance of a tap operation (S13) and ends the operation determination process.

On the other hand, if it is determined in S04 that the operation performed by the operating member is not a flick operation (S04: No), that is, if the operation performed by the operating member is a tap operation, the printer device control unit 11 determines whether or not it is within a disabled period in accordance with a result of time measurement performed by the timer 11*d* (S14). If the printer device control unit 11 is determined to be within the disabled period (S14: Yes), the printer device control unit 11 ends the operation determination process. Further, if it is determined to be within the disabled period (S14: No), the printer device control unit 11 performs a selection process in response to the tap operation (S15) and ends the operation determination process.

As described above, according to the printer device 1 of the present embodiment, it is possible to set a disabled period, in which acceptance of a tap operation is disabled, to be longer when it is determined that a flick operation performed on the operation panel 13 includes repeatedly performed operations than when it is determined that the flick operation performed on the operation panel 13 does not include repeatedly performed operations. It is therefore possible to suppress an erroneous operation when a flick operation is repeated. Further, the printer device 1 sets a disabled period when a scroll process in response to a flick operation is performed and thus can suppress an unintended tap operation when a subtle scroll process in response to a repetition of flick operations is performed.

Further, the printer device 1 stores the operation history 12*a* of the operation panel 13 and, when determining that a flick operation has been continuously performed M times or more, determines that the flick operation includes repeatedly performed operations. It is therefore possible to accurately determine that a flick operation is repeatedly performed.

Further, the printer device 1 sets the disabled period T2 in accordance with the operation interval when a flick operation is repeatedly performed and can thus disable acceptance of a tap operation for only a suitable period in accordance with a user operation.

Note that the following modified examples can be employed in the first embodiment.

Modified Example 1-1

Figure 7:
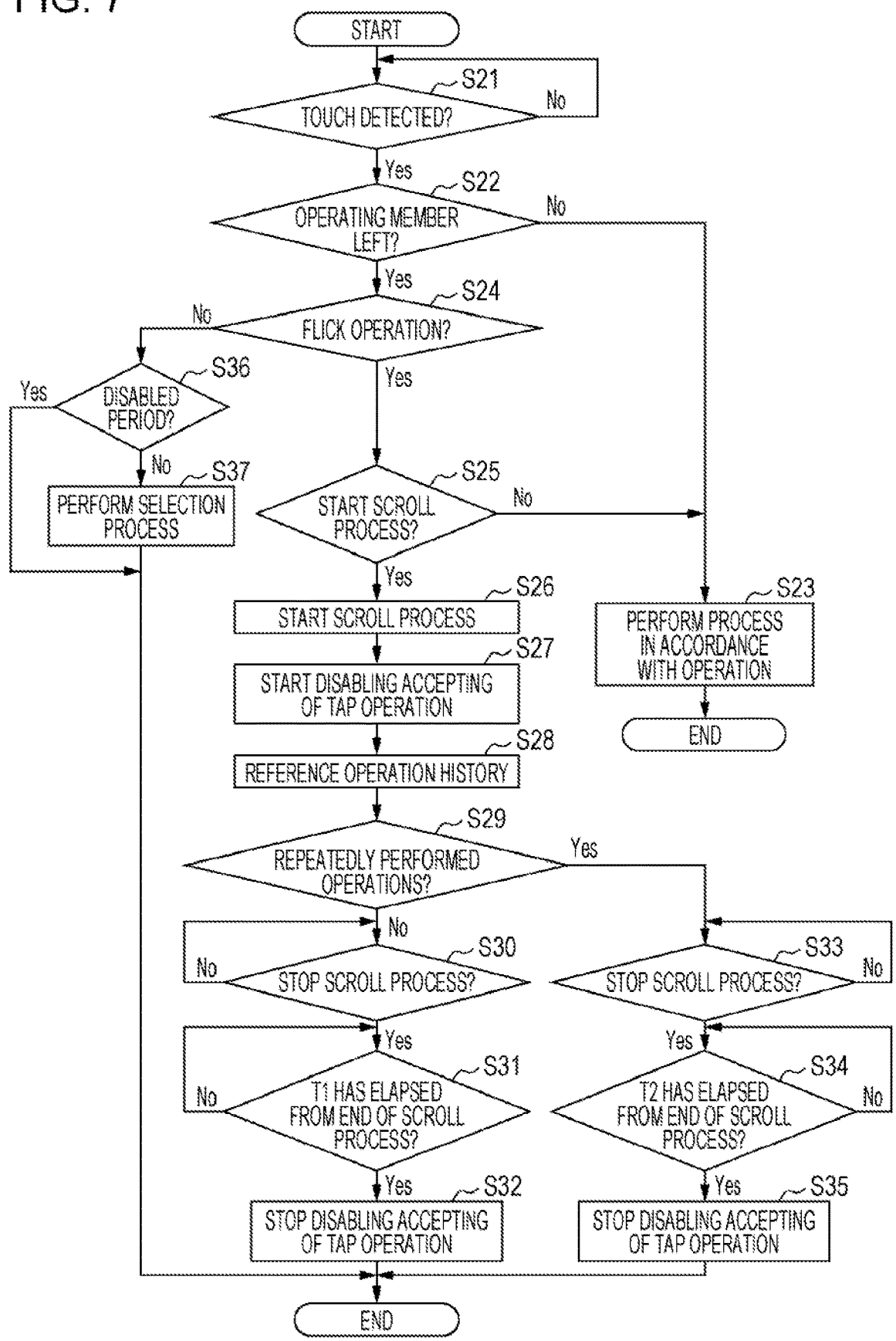
FIG. 7 is a flowchart illustrating a flow of an operation determination process in the printer device according to a modified example.

Although the printer device control unit 11 starts measuring time of a disabled period from the time a flick operation has ended in the embodiment described above, time measurement of a disabled period may be started from the end of a scroll process caused by a flick operation. FIG. 7 is a flowchart illustrating the flow of an operation determination process performed by the printer device 1 in accordance with this modified example. In the flowchart of FIG. 7, since steps S21 to S28 are the same as steps S01 to S08 of the first embodiment illustrated in FIG. 6, the description thereof will be omitted.

If it is determined that the flick operation in accordance with Yes-determination in S24 does not include repeatedly performed operations (S29: No), the printer device control unit 11 determines whether or not the scroll process ended (S30). If it is determined that the scroll process did not end (S30: No), the printer device control unit 11 enters a standby mode until the scroll process ends. Further, if it is determined that the scroll process ended (S30: Yes), the printer device control unit 11 starts measuring time of a disabled period by using the timer 11*d* and determines whether or not the disabled period T1 has elapsed from the end of the scroll process (S31). If it is determined that the disabled period T1 has not yet elapsed from the end of the scroll process (S31: No), the printer device control unit 11 enters a standby mode until the disabled period T1 elapses and, if it is determined that the disabled period T1 has elapsed (S31: Yes), stops disabling acceptance of a tap operation (S32) and ends the operation determination process.

Further, if it is determined that the flick operation in accordance with Yes-determination in S24 includes repeatedly performed operations (S29: Yes), the printer device control unit 11 determines whether or not the scroll process ended (S33). If it is determined that the scroll process did not end (S33: No), the printer device control unit 11 enters a standby mode until the scroll process ends. Further, if it is determined that the scroll process ended (S33: Yes), the printer device control unit 11 starts measuring time of a disabled period by using the timer 11*d* and determines whether or not the disabled period T2 has elapsed from the end of the scroll process (S34). If it is determined that the disabled period T2 has not yet elapsed from the end of the scroll process (S34: No), the printer device control unit 11 enters a standby mode until the disabled period T2 elapses and stops disabling acceptance of a tap operation (S35) and, if it is determined that the disabled period T2 has elapsed (S34: Yes), ends the operation determination process. Since steps S36 and S37 of the flowchart illustrated in FIG. 7 are the same as steps S14 and S15 in the flowchart illustrated in FIG. 6, the description thereof will be omitted.

As described above, according to this modified example, since time measurement of a disabled period, in which acceptance of a tap operation is disabled, is started from the end of a scroll process, an erroneous tap operation can be reliably suppressed after the end of the scroll process. Note that, in this modified example, the printer device control unit 11 disables acceptance of a tap operation from the time when a scroll process starts to the time when a disabled period elapses after the end of the scroll process. That is, when the scroll process period is T0 and the disabled period is T1, acceptance of a tap operation is disabled during a period (T0+T1) from the start of the scroll process.

Modified Example 1-2

Note that, although the printer device control unit 11 disables acceptance of a tap operation from the time when a scroll process starts to the time when a disabled period elapses after the end of the scroll process in the modified example 1-1, acceptance of a tap operation may not be disabled during a scroll process.

Modified Example 1-3

Although the printer device control unit 11 determines that a flick operation includes repeatedly performed operations when it is determined that a flick operation has been continuously performed for four times or more in the embodiment described above, the printer device control unit 11 may determine that a flick operation includes repeatedly performed operations if continuous four or more times of flick operations are performed and the operation interval of the flick operations is within a certain period. For example, let us assume that the operation history 12a illustrated in FIG. 3 is stored in the printer device storage unit 12, "operation interval ta" exceeds a certain period, and "operation interval tb", "operation interval tc", and "operation interval td" are performed within the certain period. In such a case, the printer device control unit 11 may set the disabled period to T1 after "fourth flick operation" and set the disabled period to T2 after "fifth flick operation".

Modified Example 1-4

Further, determination as to whether or not a flick operation includes repeatedly performed operations may be based on whether or not predetermined times or more of flick operations have been performed within a predetermined period, whether or not predetermined times or more of flick operations have been performed without interposing a certain interval, or the like other than whether or not flick operations have been performed continuously.

Modified Example 1-5

Although the printer device control unit 11 calculates the disabled period T2 in accordance with the operation intervals of four continuously performed flick operations, the disabled period T2 may be calculated in accordance with operation intervals of all the flick operations stored in the operation history 12a. For example, when the operation history 12a illustrated in FIG. 3 is stored in the printer device storage unit 12, the printer device control unit 11 may calculate the disabled period T2 after the end of "ninth flick operation" in accordance with "operation interval to", "operation interval tb", "operation interval tc", "operation interval td", "operation interval tg", "operation interval th", and "operation interval ti". Further, the printer device control unit 11 may calculate the disabled period T2 in accordance with the operation interval of flick operations that have been performed after an operation performed earlier by a predetermined number of times or more instead of the operation intervals of all the flick operations stored in the operation history 12a. Further, the disabled period T2 may be calculated in accordance with the period of a flick operation instead of an operation interval of flick operations, or the disabled period T2 may be calculated in accordance with various manners of flick operations including a combination of the above.

Modified Example 1-6

Although the printer device control unit 11 starts disabling acceptance of a tap operation when a scroll process is started due to a flick operation in the embodiment described above (see S06 and S07 of FIG. 6), disabling of acceptance of a tap operation may be started regardless of whether or not a scroll process is started.

Modified Example 1-7

Although the printer device control unit 11 stops disabling acceptance of a tap operation at the time when the disabled period T1 elapses from the time a flick operation has ended regardless of whether or not a scroll process ended when it is determined that the flick operation does not include repeatedly performed operations (see S10 and S11 of FIG. 6), the printer device control unit 11 may stop disabling of acceptance of a tap operation if a scroll process ended. That is, the printer device control unit 11 may be configured so as not to stop disabling acceptance of a tap operation unless a scroll process ended even after the disabled period T1 has elapsed from the time a flick operation has ended. Similarly, the printer device control unit 11 may be configured so as not to stop disabling acceptance of a tap operation unless a scroll process ended even when it is determined that the flick operation includes repeatedly performed operations and even after the disabled period T2 has elapsed from the time the flick operation has ended.

Modified Example 1-8

When a screen includes a region intended for scroll and a region not intended for scroll, acceptance of a tap operation in the region intended for scroll may be disabled from the time when a scroll process starts to the time when a disabled period elapses from the end of the scroll process, and acceptance of a tap operation may be enabled in the region not intended for scroll even when scroll is performed in the region intended for scroll.

Modified Example 1-9

Although a user operation performed on the operation panel 13 provided to the printer device 1 has been described in the above embodiment, the above embodiment is applicable to a user operation performed on the operation panel 13 provided to other electronic devices than the printer device 1. For example, the above embodiment is applicable to electronic devices such as a tablet terminal, a smartphone, or the like.

Second Embodiment

Next, a second embodiment will be described. Although a user operation performed on the operation panel 13 provided to the printer device 1 has been described in the first embodiment, an object on which a user operation is performed may not necessarily be required to be the operation panel 13. Accordingly, in the present embodiment, a user operation performed on a screen displayed as a virtual image in a virtual reality (VR) device 2 will be described. Features different from those of the first embodiment will be mainly described below. Note that, in the present embodiment, the same components as those in the first embodiment will be labeled with the same references, and detailed description will be omitted. Further, a modified example applied to the same component as that of the first embodiment may be similarly applied to the present embodiment.

Figure 8:
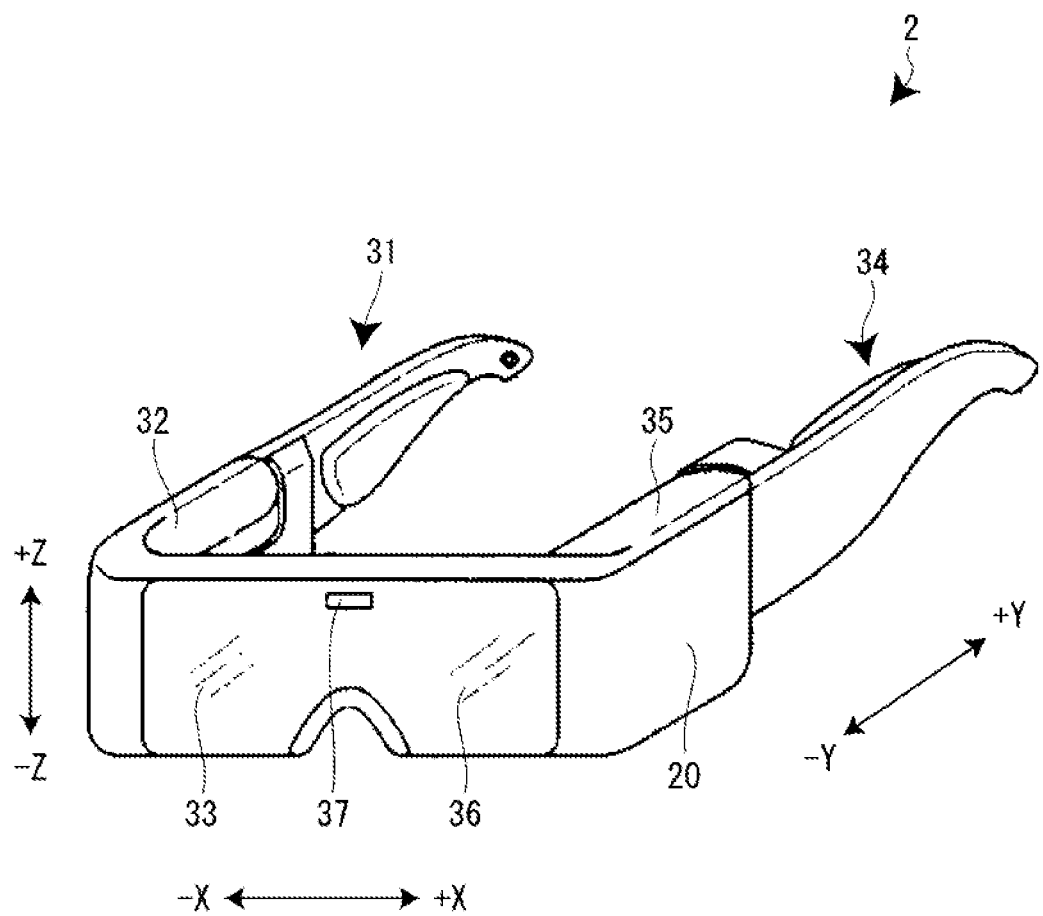
FIG. 8 is a perspective external view of a VR device according to a second embodiment.

FIG. 8 is a perspective external view of a VR device 2 in accordance with the second embodiment. The VR device 2 is an example of "electronic device". The VR device 2 in accordance with the present embodiment is a see-through type head mount display by which the user can view an external landscape at the same time when viewing a virtual image. The VR device 2 has a glass-shaped VR main body 20. A right display unit 33, a sensor 37, and a left display unit 36 are provided from the −X direction side on the front face that is a face on the −Y direction side of the VR main body 20. Further, a right holding member 31 and a right display drive unit 32 are provided on the −X direction side of the VR main body 20. A left holding member 34 and a left display drive unit 35 are provided on the +X direction side of the VR main body 20.

The end on the +X direction side of the right display unit 33 and the end on the −X direction side of the left display unit 36 are connected at the middle of the forehead of the user when the VR device 2 is worn. The right holding member 31 extends from the end on the −X direction side of the right display unit 33. Similarly, the left holding member 34 extends from the end on the +X direction side of the left display unit 36. The right holding member 31 and the left holding member 34 holds the VR device 2 on the user's head in the same manner as temples of glasses.

The right display drive unit 32 is arranged on the +X direction side of the right holding member 31, namely, on the side facing the user's head when the VR device 2 is worn and near the right display unit 33. Further, the left display drive unit 35 is arranged on the −X direction side of the left holding member 34 and near the left display unit 36. Each of the right display drive unit 32 and the left display drive unit 35 includes a transmission type liquid crystal panel that forms an image, a light source that irradiates the transmission type liquid panel, and a projection optical system that projects an image light emitted from the transmission type liquid crystal panel.

The right display unit 33 and the left display unit 36 are arranged at positions corresponding to the right eye and the left eye of the user when the VR device 2 is worn, respectively. The right display unit 33 and the left display unit 36 guide image lights output from the right display drive unit 32 and the left display drive unit 35 to the user's eyes through reflection along predetermined light paths, respectively. Any scheme may be used for the right display unit 33 and the left display unit 36 as long as virtual images are formed in front of the user's eyes by using image lights. For example, a diffraction grating such as a hologram element may be used, or a semi-transparent reflection film may be used.

The sensor 37 is an image capture device arranged at a position corresponding to the middle of the forehead of the user when the VR device 2 is worn. The sensor 37 captures a landscape in front of the user wearing the VR device 2 and captures an operating member operated by the user. Note that, although a single sensor 37 is illustrated in this example, a plurality of sensors 37 may be provided. Further, although the image capture device is illustrated as the sensor 37 in this example, a laser sensor, an ultrasonic sensor, or the like may be used.

Figure 9:
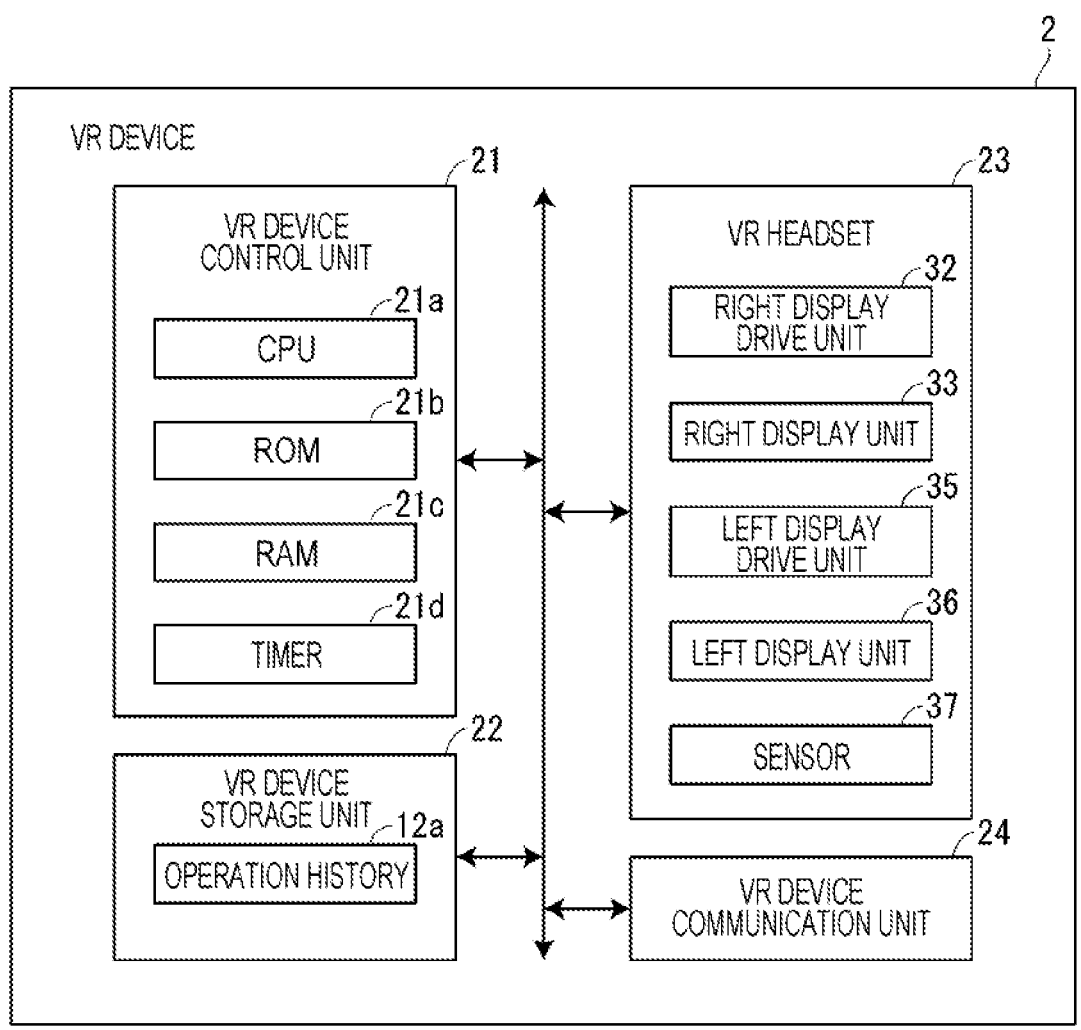
FIG. 9 is block diagram illustrating a control configuration of the VR device according to the second embodiment.

FIG. 9 is a block diagram illustrating the configuration of the VR device 2. The VR device 2 has a VR device control unit 21, a VR device storage unit 22, a VR headset 23, and a VR device communication unit 24. The VR device control unit 21 is an example of "determination unit" and "disabling unit".

The VR device control unit 21 includes a CPU 21a, a ROM 21b, a RAM 21c, and a timer 21d. The CPU 21a controls respective components in the VR device 2 by loading a control program stored in the ROM 21b into the RAM 21c and executing the control program. The control program is an example of "program". The timer 21d is used as a component for measuring time of an operation interval and a disabled period. The VR device storage unit 22 is a storage device such as flash memory, for example, and stores the operation history 12a (see FIG. 3).

The VR headset 23 includes the right display drive unit 32, the right display unit 33, the left display drive unit 35, the left display unit 36, and the sensor 37. The VR device communication unit 24 communicates with an upstream device and receives display data from the upstream device. The VR device control unit 21 controls the right display drive unit 32 and the left display drive unit 35 to display virtual images on the right display unit 33 and the left display unit 36 in accordance with display data acquired from the upstream device.

With the configuration described above, the VR device control unit 21 generates control signals used for controlling the right display drive unit 32 and the left display drive unit 35 and performs display control to perform a scroll process, a tap process, or the like on a screen displayed as a virtual image. Further, the VR device control unit 21 analyzes an image captured by the sensor 37 and detects the position and motion of an operating member. This enables the user to operate a screen displayed as a virtual image. That is, the VR device control unit 21 of the present embodiment uses the sensor 37 to perform operation detection on a screen displayed as a virtual image. The sensor 37 is an example of "digitizer". Further, the VR device control unit 21 of the present embodiment determines whether or not a flick operation or a tap operation is performed on the screen displayed as a virtual image in accordance with a result of detection performed by the sensor 37.

As described above, according to the present embodiment, the same effects and advantages as those of the first embodiment can be obtained when the VR device 2 is used.

Although two embodiments have been illustrated above, each of the embodiments described above is applicable to any detection device that can detect a user operation including a flick operation and a tap operation without being limited to the operation panel 13 or the VR headset 23 illustrated in the embodiments. For example, a detection device such as an electronic pen, a pointing device, or the like is applicable as "digitizer".

Further, the protection scope of the disclosure includes a method for performing each process of the printer device 1 and the VR device 2 illustrated in each embodiment and each modified example described above, a program used for performing each process of the printer device 1 and the VR device 2, and a computer readable storage medium storing the program. Further, each embodiment may be combined with each modified example. In addition, appropriate modifications are possible within the scope not departing from the spirit of the disclosure, such as to realize each process of the printer device 1 and the VR device 2 in cooperation with hardware and software.

Supplementary Notes

An electronic device and a program will be additionally noted below.

The printer device 1 includes the operation panel 13 and the printer device control unit 11 that determines whether or not a flick operation performed on the operation panel 13 includes repeatedly performed operations and disables acceptance of a tap operation from the time the flick operation has ended for a longer period when it is determined that the flick operation performed on the operation panel 13 includes repeatedly performed operations than when it is determined that the flick operation performed on the operation panel 13 does not include repeatedly performed operations.

The program causes the printer device 1 having the operation panel 13 to perform steps of determining a flick operation performed on the operation panel 13 includes repeatedly performed operations and disabling acceptance of a tap operation from the time the flick operation has ended for a longer period when it is determined that the flick operation performed on the operation panel 13 includes repeatedly performed operations than when it is determined that the flick operation performed on the operation panel 13 does not include repeatedly performed operations.

According to the above configuration, the printer device 1 disables acceptance of a tap operation from the time the flick operation has ended for a longer period when it is determined that the flick operation performed on the operation panel 13 includes repeatedly performed operations than when it is determined that the flick operation performed on the operation panel 13 does not include repeatedly performed operations and thus may suppress an erroneous operation when a flick operation is repeatedly performed.

The printer device 1 includes the printer device control unit 11 that determines whether or not a flick operation performed on the operation panel 13 that causes a scroll process to be performed includes repeatedly performed operations and disables acceptance of a tap operation from the end of the scroll process caused by the flick operation for a longer period when it is determined that the flick operation performed on the operation panel 13 includes repeatedly performed operations than when it is determined that the flick operation performed on the operation panel 13 does not include repeatedly performed operations.

The program causes the printer device 1 having the operation panel 13 to perform steps of determining whether or not a flick operation performed on the operation panel 13 that causes a scroll process to be performed includes repeatedly performed operations and disabling acceptance of a tap operation from the end of the scroll process caused by the flick operation for a longer period when it is determined that the flick operation performed on the operation panel 13 includes repeatedly performed operations than when it is determined that the flick operation performed on the operation panel 13 does not include repeatedly performed operations.

According to the above configuration, the printer device 1 disables acceptance of a tap operation from the end of the scroll process caused by the flick operation for a longer period when it is determined that the flick operation performed on the operation panel 13 includes repeatedly performed operations than when it is determined that the flick operation performed on the operation panel 13 does not include repeatedly performed operations and thus may suppress an erroneous operation when a scroll process is performed due to repetition of flick operations.

In the printer device 1 described above, the printer device storage unit 12 that stores an operation history that is a history of operations on the operation panel 13 may be provided, and when determining that a flick operation performed on the operation panel 13 has been continuously performed for M times or more (where M is an integer greater than or equal to two) in accordance with the operation history, the printer device control unit 11 may determine that the flick operation includes repeatedly performed operations.

According to the above configuration, the printer device 1 may accurately determine whether or not a flick operation includes repeatedly performed operations by determining whether or not a flick operation performed on the operation panel 13 has been continuously performed for M times or more.

In the printer device 1 described above, the printer device storage unit 12 that stores operation intervals when a flick operation is repeated may be provided, and when it is determined that the flick operation performed on the operation panel 13 is a repeatedly performed operation, the printer device control unit 11 may disable acceptance of a tap operation for a longer period when the operation interval is a first period than when the operation interval is a second period that is longer than the first period.

According to the above configuration, the printer device 1 may disable acceptance of a tap operation for a suitable period in accordance with the stored operation interval of flick operations.

What is claimed is:

1. An electronic device comprising:
   a digitizer configured to receive a plurality of flick operations;
   a determination unit that:
   determines an operation interval for each flick operation based on a number of flick operations that have been performed on the digitizer repeatedly;
   when the number of flick operations repeatedly performed on the digitizer is greater than a predetermined number, determines a first disabled period; and
   when the number of flick operations repeatedly performed on the digitizer is no greater than the predetermined number, determines a second disabled period that is shorter than the first operation interval;
   a storage unit that stores each of the number of flick operations relational to each operational interval determined by the determination unit as an operation history; and
   a disabling unit that:
   disables acceptance of a tap operation from a time after a last flick operation of the number of flick operations has ended for the first disabled period or the second disabled period that is determined by the determination unit, wherein
   in response to receiving, by the digitizer, a first flick operation among the plurality of flick operations at a first time, the storage unit is configured to store the first time,
   in response to receiving, by the digitizer, a second flick operation among the plurality of flick operations at a second time, the storage unit is configured to store the second time,
   the determination unit is configured to determine an operation interval between the first flick operation and the second flick operation based on the first time and the second time,
   the storage unit is configured to store the operation interval,
   determination unit is configured to determine the first disabled period or the second disabled period based on a number of operation intervals corresponding to a number of flick operations that have been repeatedly performed.

2. The electronic device according to claim 1, wherein when determining that a flick operation performed on the digitizer is performed continuously M times or more in accordance with the operation history, where M is an integer greater than or equal to two, the determination unit determines that the flick operation includes repeatedly performed operations.

3. The electronic device according to claim 1, wherein when it is determined that the flick operation performed on the digitizer includes repeatedly performed operations, the disabling unit disables acceptance of the tap operation for a period in accordance with a manner of repetition of the flick operation.

4. The electronic device according to claim 3, wherein when it is determined that the flick operation performed on the digitizer includes repeatedly performed operations, the disabling unit disables acceptance of the tap operation for a longer period when an interval of flick operations is equal to a first period than when an interval of flick operations is equal to a second period that is longer than the first period.

5. An electronic device comprising:
a digitizer configured to receive a plurality of flick operations;
a determination unit that:
determines an operation interval based on a number of flick operation(s) is performed on the digitizer, the number of flick operation(s) causing a scroll process to be performed;
when the number of flick operations performed on the digitizer is greater than a predetermined number, determines a first disabled period; and
when the number of flick operations performed on the digitizer is no greater than the predetermined number, determines a second disabled period that is shorter than the first operation interval;
a storage unit that stores each of the number of flick operations relational to each operational interval determined by the determination unit as an operation history; and
a disabling unit that:
disables acceptance of a tap operation from an end of the scroll process caused by the number of flick operation(s) for the first disabled period or the second disabled period determined by the determination unit, wherein
in response to receiving, by the digitizer, a first flick operation among the plurality of flick operations at a first time, the storage unit is configured to store the first time,
in response to receive, by the digitizer, a second flick operation among the plurality of flick operations at a second time, the storage unit is configured to store the second time,
the determination unit is configured to determine an operation interval between the first flick operation and the second flick operation based on the first time and the second time,
the storage unit is configured to store the operation interval, and determination unit is configured to determine the first disabled period or the second disabled period based on a number of operation intervals corresponding to a number of flick operations that have been repeatedly performed.

6. The electronic device according to claim 5, wherein when determining that a flick operation performed on the digitizer is performed continuously M times or more in accordance with the operation history, where M is an integer greater than or equal to two, the determination unit determines that the flick operation includes repeatedly performed operations.

7. The electronic device according to claim 5, wherein when it is determined that the flick operation performed on the digitizer includes repeatedly performed operations, the disabling unit disables acceptance of the tap operation for a period in accordance with a manner of repetition of the flick operation.

8. The electronic device according to claim 7, wherein when it is determined that the flick operation performed on the digitizer includes repeatedly performed operations, the disabling unit disables acceptance of the tap operation for a longer period when an interval of flick operations is equal to a first period than when an interval of flick operations is equal to a second period that is longer than the first period.

9. A non-transitory computer-readable storage medium storing a program that causes an electronic device comprising a digitizer to perform:
determining an operation interval based on a number of flick operation(s) that are performed on the digitizer repeatedly, comprising:
when the number of flick operations performed on the digitizer is greater than a predetermined number, determining a first disabled period; and
when the number of flick operations performed on the digitizer is no greater than the predetermined number, determining a second disabled period, the number of flick operation(s) causing a scroll process to be performed;
storing each of the number of flick operations relational to each determined operational interval as an operation history, storing each of the number of flick operations comprising:
in response to receiving a first flick operation among the number of flick operations at a first time, storing the first time;
in response to receiving a second flick operation among the number of flick operations at a second time, storing the second time;
determining an operation interval between the first flick operation and the second flick operation based on the first time and the second time; and
storing the operation interval between the first flick operation and the second flick operation, wherein determining the first disabled period or the second disabled period is based on a number of operation intervals corresponding to a number of flick operations that have been repeatedly performed; and
disabling acceptance of a tap operation from an end of the scroll process caused by the number of flick operation (s) for the determined operation interval.

* * * * *